US010605175B2

(12) United States Patent
Dalley et al.

(10) Patent No.: US 10,605,175 B2
(45) Date of Patent: Mar. 31, 2020

(54) TEMPERATURE CONTROL SYSTEM FOR GAS COMBUSTION ENGINES AND METHOD OF USING THE SAME

(71) Applicant: Rolls-Royce Corporation, Indianapolis, IN (US)

(72) Inventors: Robert C. Dalley, Waldron, IN (US); John J. Costello, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 352 days.

(21) Appl. No.: 15/664,534

(22) Filed: Jul. 31, 2017

(65) Prior Publication Data

US 2019/0032575 A1 Jan. 31, 2019

(51) Int. Cl.
*G01K 1/00* (2006.01)
*G01K 13/00* (2006.01)
*G01K 7/00* (2006.01)
*F02C 9/28* (2006.01)
*F01B 25/04* (2006.01)
*F02D 41/22* (2006.01)
*F01D 17/08* (2006.01)

(52) U.S. Cl.
CPC .............. *F02C 9/28* (2013.01); *F01B 25/04* (2013.01); *F02D 41/222* (2013.01); *F01D 17/085* (2013.01); *F05D 2270/303* (2013.01); *F05D 2270/52* (2013.01)

(58) Field of Classification Search
USPC ............... 374/163, 208, 144, 148, 166, 110
See application file for complete search history.

(56) References Cited

U.S. PATENT DOCUMENTS

| | | | |
|---|---|---|---|
| 6,142,665 A | 11/2000 | Haffner et al. | |
| 6,546,735 B1 | 4/2003 | Moniz et al. | |
| 7,577,549 B2 * | 8/2009 | Osborn | F02C 9/00 374/100 |
| 8,033,719 B2 * | 10/2011 | Beutin | F01D 17/08 374/158 |
| 9,388,744 B2 | 7/2016 | Mathews, Jr. et al. | |
| 2007/0047616 A1 * | 3/2007 | Izumiura | F02D 41/222 374/144 |
| 2010/0242492 A1 | 9/2010 | Sloat et al. | |
| 2012/0044969 A1 * | 2/2012 | Zebrowski | G01K 3/06 374/144 |
| 2012/0170611 A1 | 7/2012 | Wang et al. | |
| 2015/0092809 A1 * | 4/2015 | Khaled | F01N 11/002 374/4 |

* cited by examiner

*Primary Examiner* — Mirellys Jagan
(74) *Attorney, Agent, or Firm* — Brinks Gilson & Lione

(57) ABSTRACT

A method of managing the thermal output of a gas combustion engine having a plurality of combustion zones uses a temperature control system integrated with the engine to provide digital thermal signals to a control unit. The control unit determines when to adjust an engine operating parameter based on an analysis of the thermal signals. The temperature control system includes a plurality of smart thermal sensors with at least one sensor for each combustion zone, a communication bus, and a control unit. Each smart thermal sensor converts the measured temperature from an analog thermal signal to a digital thermal signal.

20 Claims, 4 Drawing Sheets

TEMPERATURE CONTROL SYSTEM FOR GAS COMBUSTION ENGINES AND METHOD OF USING THE SAME

TECHNICAL FIELD

This disclosure relates generally to the thermal management of gas combustion in an engine environment. More specifically, this disclosure relates to a method of making and using thermal measurements to monitor and adjust the performance of a gas combustion engine.

BACKGROUND

The statements in this section merely provide background information related to the present disclosure and may not constitute prior art.

The performance of a gas combustion engine is directly related to the maximum temperature achievable within the combustion chamber. For example, in a turbine engine continuous power or thrust is produced by a fast-moving flow of combustion gases that cause a rotor fitted with blades to revolve. The type of materials used to form the engine components (e.g., turbine blades, etc.) limits the magnitude of this thrust. As the push for higher thrust and greater efficiency drives engine temperatures closer to the limits associated with the materials used in the construction of the engine, it is becoming increasingly important to be able to measure and control these temperatures. In addition, design engineers need to know how blade temperatures respond to design changes, and maintenance personnel need to know to what temperatures engine components are exposed.

BRIEF DESCRIPTION OF THE DRAWINGS

In order that the disclosure may be well understood, there will now be described various forms thereof, given by way of example, reference being made to the accompanying drawings, in which.

Figure 1:
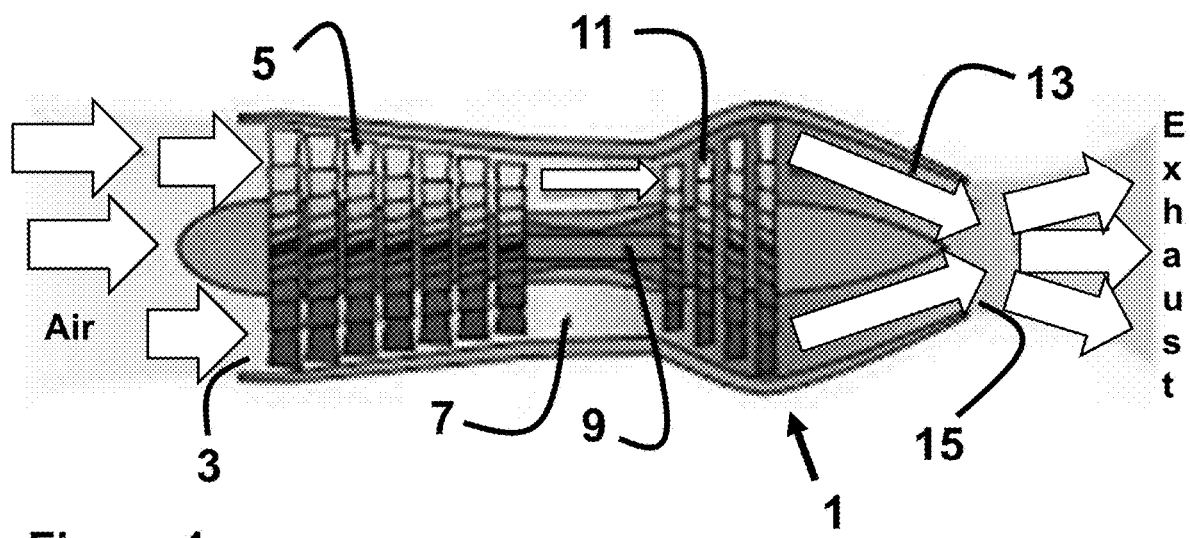
FIG. 1 is a schematic representation of a gas turbine engine highlighting the various components and airflow patterns within the engine.

The drawings described herein are for illustration purposes only and are not intended to limit the scope of the present disclosure in any way.

DETAILED DESCRIPTION

The present disclosure generally provides a temperature control system and measurement method where individual smart thermocouple elements have integral electronics to provide a pre-conditioned digital signal. These digital temperature signals are communicated through a network to a control unit or engine controller that is capable of individually monitoring all of the temperature signals. During use, the temperature data is logged in real-time with optimized accuracy and response time. Upon analysis of the digital temperature signals, the engine controller can either decrease the fuel flow to one or more of the higher temperature zones or increase the fuel flow to one or more of the lower temperature zones in the combustion chamber.

The following description is merely exemplary in nature and is in no way intended to limit the present disclosure or its application or uses. For example, the temperature control system made and used according to the teachings contained herein is described throughout the present disclosure in conjunction with a gas turbine engine in order to more fully illustrate the temperature control system and the use thereof. The incorporation and use of such a temperature control system in other applications, including without limitation, a gas piston engine, or the like are contemplated to be within the scope of the present disclosure. In other words, the gas combustion engine may be a gas turbine engine or a gas piston engine; alternatively, the gas combustion engine is a gas turbine engine. It should be understood that throughout the description, corresponding reference numerals indicate like or corresponding parts and features.

Referring to FIG. 1, the components of a gas turbine engine 1 are shown in order to highlight the gas flow (→) and performance thereof. Air enters the engine through an inlet 3 and passes through a rotating compressor 5 that increases the air pressure. Next, the high-pressure air enters a combustion chamber 7 where it is mixed with fuel and burned without much change in pressure. This fuel is injected in the combustion chamber 7 as finely atomized droplets. The hot products formed in the combustion chamber 7 then pass through a rotating turbine 11 that extracts work from the flow and sends it to the compressor via a rotating shaft 9. The turbine 11 of the gas turbine engine 1 has the task of producing usable output shaft power to provide power to drive the compressor and all engine accessories. The exhaust of the turbine 11, e.g., a hot, high-pressure gas, is forced through a nozzle 13, which converts thermal energy to kinetic energy by causing the gas to accelerate and expand as it exits the outlet 15 in order to produce thrust.

The conventional method of measuring the exhaust gas or turbine gas temperature uses two arrays of thermocouples to monitor engine temperature at 12 to 18 locations around the engine. These arrays represent a dual redundant configuration for safety and control functions. Each of the thermocouple arrays average the outputs of 6 to 8 individual thermocouple nodes to generate an average temperature that is representative of the engine operation. The use of this averaging function facilitates efficiency and provides redundancy. Although the individual thermocouples measure engine temperatures at each of the burner locations or in each of the combustion zones, the measured output is often misleading because the average engine temperature is used instead of the actual high and low temperatures measured by each thermocouple during operation. In addition, the average output may obscure a problem with a single combustor or be unable to note the location of an individual thermocouple failure or fault.

Figure 2:
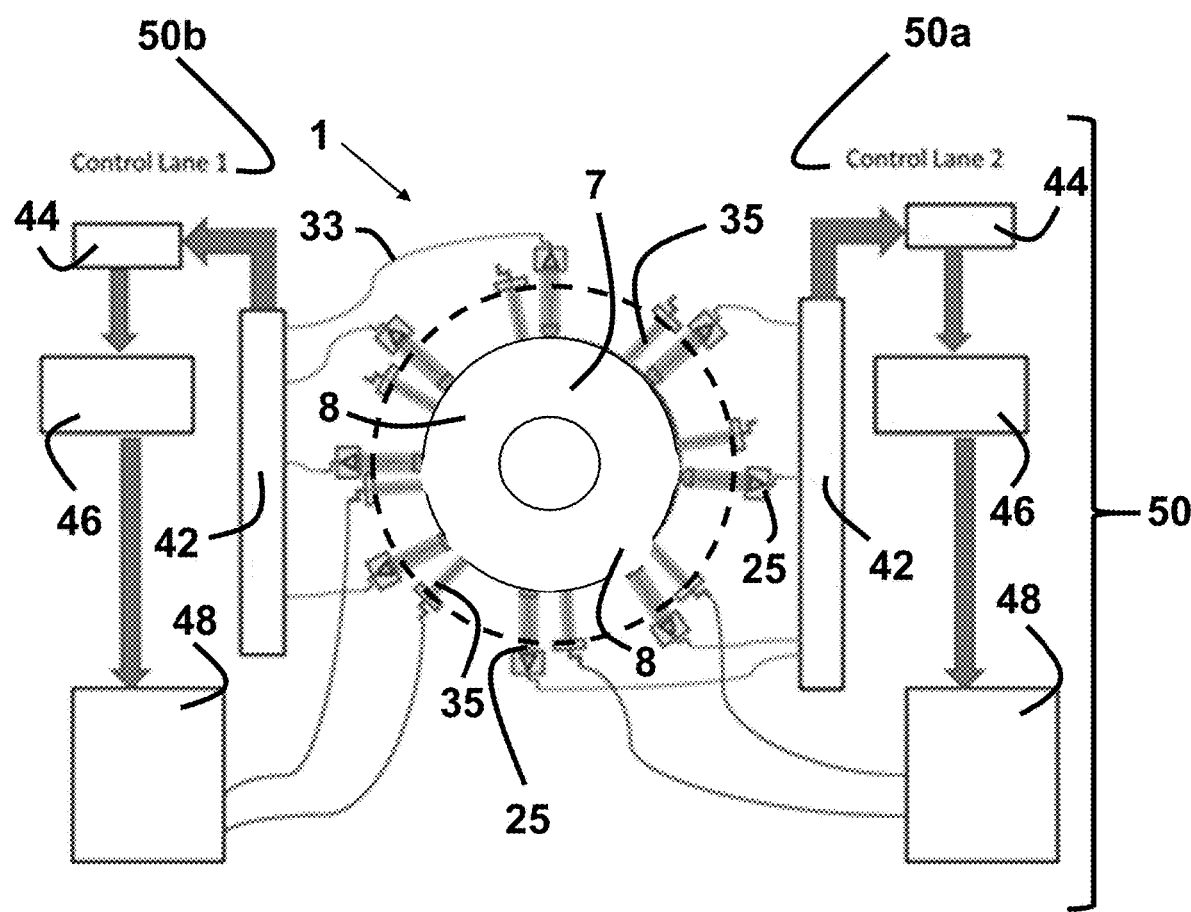
FIG. 2 is a cross-sectional schematic representation of a temperature control system formed according to the teachings of the present disclosure.

Referring now to FIG. 2, a temperature control system 50 integrated with a gas combustion engine 1 having a plurality of combustion zones 8 in a combustion chamber 7 is provided according to one aspect of the present disclosure. This temperature control system 50 comprises a plurality of smart thermal sensors 25, a communication bus 42, and a control unit 44. The smart thermal sensors are located such that at least one smart sensor 25 measures a temperature in real-time for each of the combustion zones 8. The smart thermal sensors 25 transmit a thermal signal to the communication bus 42, which is then received by the control unit 44 multiplexed therewith. The control unit 44 uses the thermal signals to adjust one or more operating parameters of the gas combustion engine.

The temperature control system 50 of the present disclosure provides for improvement in engine 1 operation. Peak engine performance can be attained via the accurate and instantaneous monitoring of temperatures in each combustion zone 8. The temperature control system 50 allows the control unit 44 to identify in real-time an individual combustion zone 8 that is underperforming and adjust an engine operating parameter. In this manner, such control will allow for more efficient fuel burning, decreased emissions, and increased life of various components in the combustion engine. When desirable, more than one temperature control system 50a, 50b may be utilized to monitor and control the performance of a single combustion engine 1.

In addition, the temperature control system 50 of the present disclosure allows the control unit 44 to identify a failure with a thermal sensor 25 and to initiate an appropriate maintenance procedure. Each thermal sensor 25 is designed to operate within acceptable performance limits for a number of cycles that surpasses the point at which the engine is scheduled for maintenance and/or replacement of degraded components. In order for the engine to continue to operate at the same level of thrust as a new engine, it must operate hotter and/or faster in order to account for the deterioration of components. This shift from nominal operation increases with use and will eventually reach a point that exceeds the expected performance and/or recommended safety limit. Any sensor degradation or failure thereof cannot be tolerated, because it will further compound the degradation of the engine.

Referring once again to FIG. 2, the turbine engine 1 described in this specific example includes a combustion chamber 7 in which eight (8) combustion zones 8 are present. The number of combustion zones 8 present in the gas combustion engine 1 of the present disclosure may range from 2 to 18; alternatively, from 4 to 16; alternatively, from 6 to 14. The flame temperature in such combustion zones 8 may reach 1,930° C. (3,500° F.) or higher. This temperature may be higher than the temperature limit that the metals or metal alloys used in various engine components can endure. Thus, it is important that the fuel injectors and combustion liners control the burning and mixing of fuel and air under all conditions in order to avoid excessively high temperatures reaching the turbine blades or other engine components. The maximum outlet temperature from the combustion chamber (e.g., the turbine inlet temperature) in a turbine engine is about 1070° C. (1950° F.) or higher.

The combustion chamber 7 as depicted in FIG. 2 may be built directly into the design of the turbine engine 1. However, when desirable, the multiple combustion zones may be located adjacent to the engine and linked to the compressor and the turbine by manifolds. Combustion chambers built directly into the design of the engine are generally described according to their structural execution as being either annular, cannular, or sectional. An annular chamber is located between the compressor and turbine, around the rotating shaft as shown in FIGS. 1 and 2. In a cannular chamber, just as in the annular chamber, individual combustion zones are present. However, in this case the combustion zones are located in individual ducts. A circular gas collector located before the entrance to the turbine unites the gas emerging from each of the individual ducts. In comparison, a sectional chamber represents a unit that incorporates multiple independent chambers. In principle, all of the individual chambers are identical and although they operate independently, they are connected by a series of ducts for the transfer of the flame.

Still referring to FIG. 2, the gas combustion engine 1 may further comprises a plurality of fuel injectors 35, such that fuel flows through at least one fuel injector into each of the combustion zones 8 in the combustion chamber 7. The interaction between air and fuel, together with the high turbulence level present in the combustion chamber, facilitates the atomization of fuel into drops, thereby, effectively inducing the mixing of the fuel with air and allowing for efficient combustion.

The amount of fuel supplied to and mixed with the amount of air entering the combustion chamber depends upon the magnitude of the increase or decrease in temperature that is required or desired. Air entering the combustion chamber may exhibit velocities that exceed 100 m/s, alternatively between about 30 to 60 m/s for stationary engines, and between about 50 to 80 m/s for aircraft engines. The temperature in a combustion engine may range from about 850° C. to about 1,700° C. and as previously stated is limited by the characteristics of the materials from which the turbine blades and vanes are made. The air enters the combustion chamber at a temperature that is in the range of about 200° C. to about 550° C. due to the heating caused by compression. Thus, the temperature rise due to the combustion of fuel in the combustion chamber is expected to be in the range of about 650° C. to about 1150° C. This temperature rise may be achieved by varying the air to fuel ratio present in the combustion chamber between about 25:1 to about 150:1; alternatively in the range of 45:1 to 130:1; alternatively between about 65:1 to about 110:1.

Referring again to FIG. 2, the control unit 44 may decrease the flow of fuel through one or more of the fuel injectors 35 into at least one combustion zone 8 when the control unit 44 determines the temperature in that zone 8 is higher than the temperatures measured for the other combustion zones 8. Alternatively, the control unit 44 may increase the flow of fluid through one or more of the fuel injectors 35 into at least one combustion zone 8 when the control unit 44 determines the temperature in combustion zone 8 is lower than the temperatures measured for the other combustion zones 8. The control unit 44 may accomplish this action by integration with a fuel parameters measurement unit (FPMU) 46 that includes nozzle control functions that can adjust the individual controls 48 associated with the fuel injectors.

Figure 3:
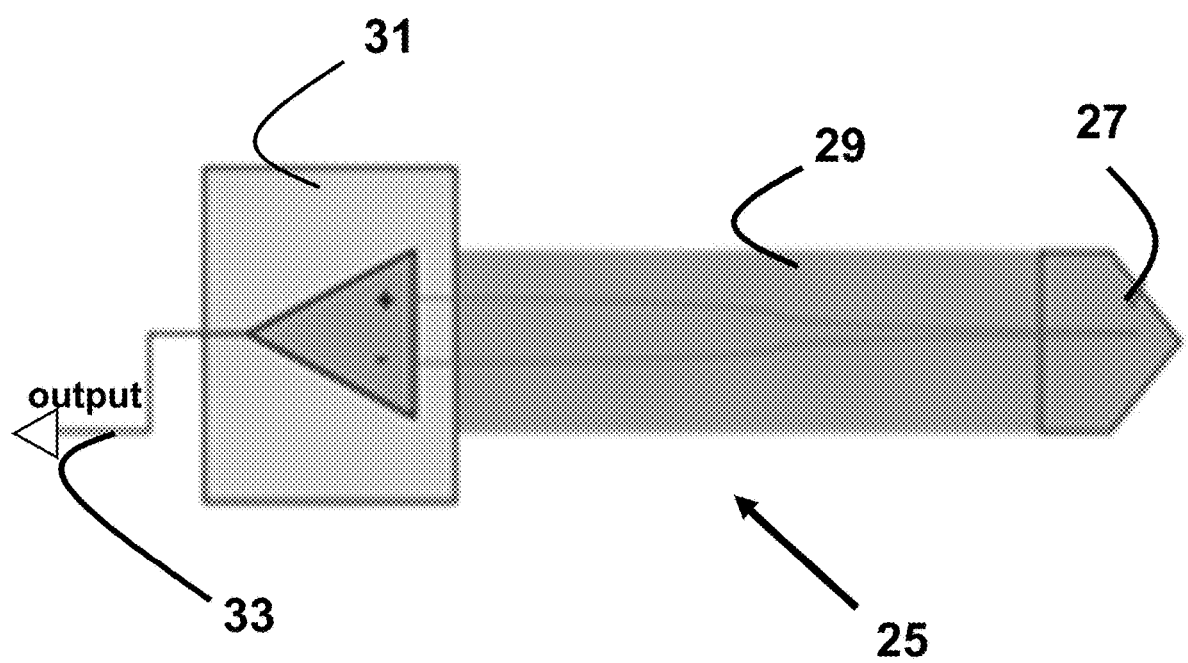
FIG. 3 is a schematic representation of one specific example of a smart sensor thermocouple that may be incorporated into the temperature control system of the present disclosure.

Referring now to FIGS. 2 and 3, the smart thermal sensors 25 used in the temperature control system 50 of the present disclosure outputs 33 a digital signal to the communication bus. The smart thermal sensors 25 comprise a thermocouple element 27, an analog to digital signal converter 31, and optionally a sheath 29. The temperature control system 50 may utilize traditional or conventional components, including but not limited to thermocouple harnesses, fiber optic interconnections, and potentially even wireless methods for signal transmission from the thermocouples to the communication bus 42 and/or the control unit 44.

The thermocouple element 27 may include, without limitation, a type of optical fiber sensor, pyrometer, or a Seebeck-type element. Optical fiber sensors or pyrometers may measure thermal radiation using one or more line of sight diagnostic techniques. A Seebeck-type element measures the electric potential between dissimilar metals. More specifically, these thermocouples measure the voltage produced by a temperature difference between two junctions formed between two thermoelectrically dissimilar metals (positive/ negative). While any two metals with different thermal emissivity (c) can be used to produce a thermocouple, a small number of metals (both pure and alloys) are conventionally used due to their stability, linearity, reproducibility, and high temperature capability. Several examples of the various metal combinations that may be used to form a thermocouple are provided, without limitation, in Table 1 along with a description of their approximate limiting operating temperature and environments. The selection of specific metal combinations for use in any application is based upon the expected temperature range for the given application and the atmosphere or environment to which the thermocouple is to be exposed. A protective sheath may be optionally utilized to provide a barrier between the Seebeck-type element and the environment. This protective sheath may include, but not be limited to, a thin metallic outer layer and a ceramic or metal oxide-insulating layer, which is located between the outer metallic layer and the inner metal wires.

TABLE 1

Thermocouple Materials and Associated Properties

| Material (Positive/Negative) | $T_{max}$ (° C./° F.) | ANSI Type | Allowable Atmosphere |
|---|---|---|---|
| Tungsten/ Tungsten 26% rhenium | 2,320/4,210 | — | inert, H2 (nonoxidizing) |
| Tungsten 5% rhenium/ Tungsten 26% rhenium | 2,320/4,210 | — | inert, H2 (nonoxidizing) |
| Platinum 30% rhodium/ Platinum 6% rhodium | 1,820/3,310 | B | oxidizing, inert |
| Platinum 13% rhodium/ Platinum | 1,770/3,200 | R | oxidizing, inert |
| Platinum 10% rhodium/ Platinum | 1,770/3,200 | S | oxidizing, inert |
| Chromel/Alumel | 1,370/2,500 | K | oxidizing, inert |
| Chromel/Constantan | 1,000/1,830 | E | oxidizing, inert |
| Iron/Constantan | 1,200/2,193 | J | reducing, inert, vacuum |

One skilled in the art will understand that the thermal sensor 25 may be directly wired 33 to the communications bus 42 as shown in FIG. 2. However, the use of a wireless temperature sensor is anticipated and does not exceed the scope of the present disclosure as long as the wireless sensor is designed to operate in, e.g., withstand exposure to, the combustion chamber of the gas combustion engine. The wire-less sensor may be similar to an integrated circuit; i.e. can be "printed" on a turbine blade or other surface. Such a wire-less sensor offers the benefits of having a small sensor footprint and thermal mass, having only a limited effect on the vibrational characteristics of the turbine blades, and being able to provide a rapid response and measure the true surface temperature. The wireless sensors may comprise an antenna, a diode, and when desirable a material possessing temperature-dependent electrical properties capable of altering the antenna center frequency as the temperature changes.

The control unit may be, without limitation, an electronic control unit (ECU), an electronic engine control (EEC) unit, or a full authority digital engine controller (FADEC). The control unit may be integrated with a fuel parameters measurement unit (FPMU), a fuel control unit (FCU), or fuel flow regulator (FFR). The FCU, FFR, or FPMU responds to the control unit's commands and performs the functions necessary, desired, and/or requested for engine operation and protection.

The control unit uses the signals from the temperature sensors to determine the required fuel mixture and ignition timing for the next combustion event in each combustion zone. The required quantity of fuel is injected into each combustion zone at the appropriate time, with respect to crank position, by a solenoid-style fuel injector. The injector's control coil may be driven directly by the associated control unit.

In addition, a Full Authority Digital Engine Control System (FADEC) is a total system for the control of an engine. The FADEC receives all the necessary data for engine operation and can assume virtually all of the steady state and transient control functions. Thus, fuel system components may be reduced to a pump, control valve and injector with the functioning of each being controllable by the FADEC. The FADEC's main purpose is to provide optimum engine efficiency for a given flight condition. Thus, the FADEC can monitor all of the normal engine parameters, including temperature, in order to avoid exceeding safety or performance limitations while controlling the engine through all modes of operation. FADECs are available for use with for piston engines and turbine engines.

According to another aspect of the present disclosure, a method of managing the thermal output of a combustion engine is provided. The temperature control system used in this method comprises a plurality of smart thermal sensors, wherein at least one smart thermal sensor is located in each of the combustion zones; a communication bus; and a control unit as previously discussed above and further defined herein.

Figure 4:
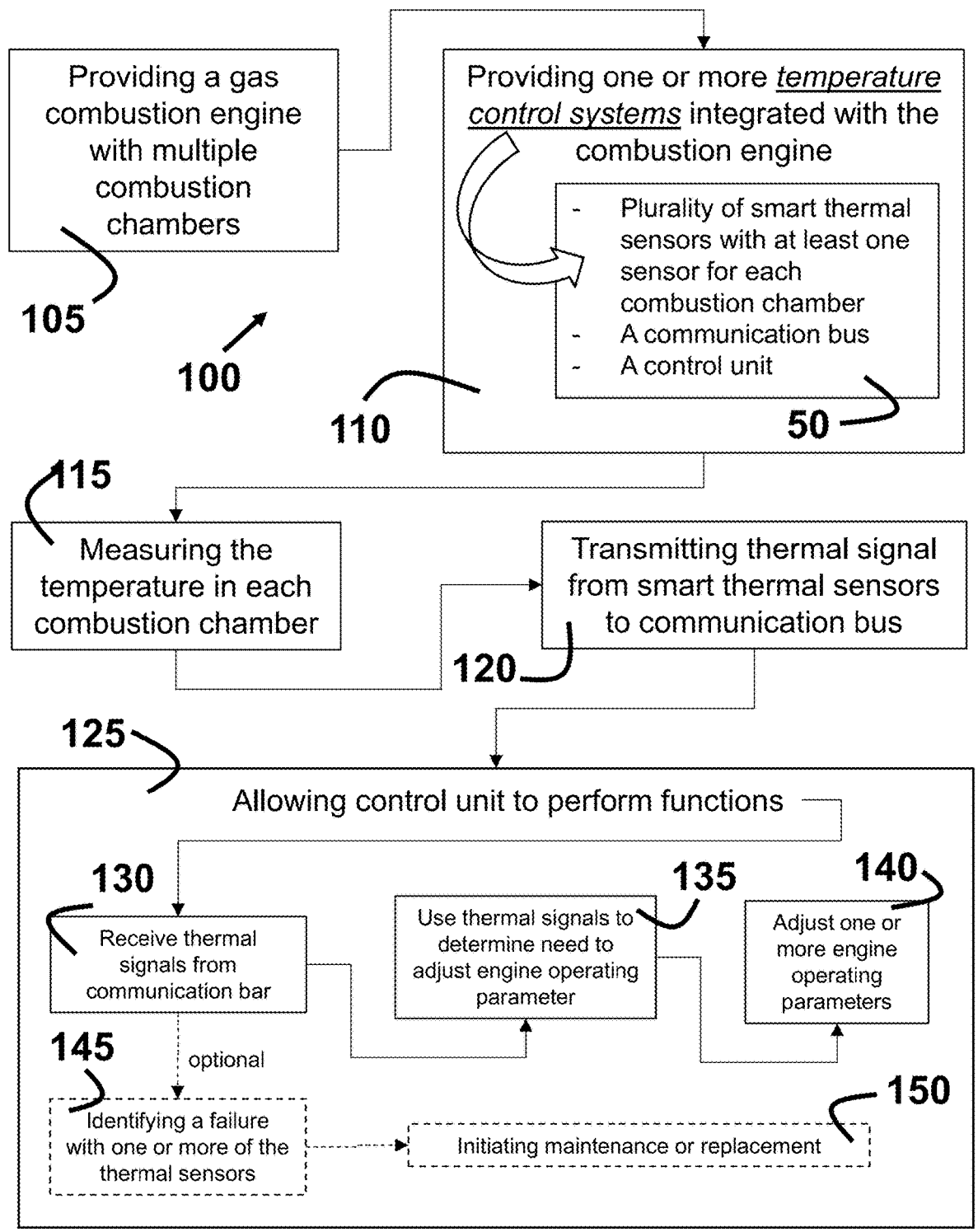
FIG. 4 is a flow diagram of a method of using the temperature control system of FIG. 2.

Referring now to FIG. 4, this method 100 comprises providing 105 a gas combustion engine having a plurality of combustion zones; providing 110 one or more temperature control systems 50 integrated with the gas combustion engine; measuring 115 the temperature in each of the combustion chambers with smart thermal sensors; transmitting 120 a thermal signal from each of the smart thermal sensors to the communication bus; and allowing 125 the control unit to perform a plurality of functions. These functions include receiving 130 the thermal signals from the communication bus; using 135 the thermal signals to determine the need to adjust one or more operating parameters of the gas combustion engine; and adjusting 140 one or more of the operating parameters.

The smart thermal sensor used in this method 100 comprises a thermocouple element, optionally, an analog to digital converter, and optionally, a protective sheath. The smart thermal sensor converts the measured temperature from an analog thermal signal to a digital thermal signal prior to transmission of the thermal signal to the communication bus. The gas combustion engine for use of this method 100 may include a gas turbine engine or a gas piston engine having a plurality of combustion zones ranging from 2 to 18. The control unit is an electronic control unit (ECU), an electronic engine control (EEC) unit, or a full authority digital engine controller (FADEC).

Still referring to FIG. 4, the method 100 may further comprise the control unit identifying 145 a failure with one or more of the thermal sensors and initiating 150 maintenance or replacement thereof. According to another aspect of the present disclosure, the gas combustion engine further comprises a plurality of combustion zones, such that fuel flows through at least one fuel injector into each of the combustion zones. The method allows 125 the control unit to decrease 140 the flow of fuel through one or more of the fuel injectors into at least one combustion zone when the control unit determines 135 the temperature in that at least one combustion zone is higher than the temperatures measured for the other combustion zones. Similarly, the method allows 125 the control unit to increase 140 the flow of fluid through one or more of the fuel injectors into at least one combustion zone when the control unit determines 135 the temperature in that at least one combustion zone is lower than the temperatures measured for the other combustion zones.

According to another aspect of the present disclosure, the use of the temperature control system comprising a plurality of smart thermal sensors integrated with a gas combustion engine having a plurality of combustion zones as described herein in order to adjust one or more operating parameters of the engine is contemplated. This temperature control system may be used according to the method described in FIG. 4 as more fully defined above.

For the purpose of this disclosure, the terms "about" and "substantially" are used herein with respect to measurable values and ranges due to expected variations known to those skilled in the art (e.g., limitations and variability in measurements).

The recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

The terms "at least one" and "one or more of" an element are used interchangeably and may have the same meaning. These terms, which refer to the inclusion of a single element or a plurality of the elements, may also be represented by the suffix "(s)" at the end of the element. For example, "at least one fiber", "one or more fibers", and "fiber(s)" may be used interchangeably and are intended to have the same meaning.

To clarify the use of and to hereby provide notice to the public, the phrases "at least one of <A>, <B>, ... and <N>" or "at least one of <A>, <B>, <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements, which may also include, in combination, additional elements not listed.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject-matter of the disclosure may also relate, among others, to the following aspects:

Aspect 1: A temperature control system integrated with a gas combustion engine that includes a plurality of combustion zones. The temperature control system comprises a plurality of smart thermal sensors, wherein the smart thermal sensors are located such that at least one smart thermal sensor measures a temperature in real-time for each of the combustion zones; a communication bus through which a thermal signal from each of the smart thermal sensors is transmitted; and a control unit that receives the thermal signals from the communication bus. The control unit uses the thermal signals to adjust one or more operating parameters of the gas combustion engine.

Aspect 2—The temperature control system according to Aspect 1, wherein the smart thermal sensor outputs a digital signal to the communication bus.

Aspect 3—The temperature control system according to Aspect 2, wherein the smart thermal sensor comprises a thermocouple element, an analog to digital signal converter, and optionally, a protective sheath.

Aspect 4—The temperature control system according to any of Aspects 1-3, wherein the gas combustion engine is a gas turbine engine or a gas piston engine.

Aspect 5—The temperature control system according to Aspect 4, wherein the gas combustion engine is a gas turbine engine.

Aspect 6—The temperature control system according to any of Aspects 1-5, wherein number of combustion zones ranges from 2 to 18.

Aspect 7—The temperature control system according to Aspect 6, wherein the number of combustion zones ranges from 4 to 16.

Aspect 8—The temperature control system according to any of Aspects 1-7, wherein the control unit is an electronic control unit (ECU), an electronic engine control (EEC) unit, or a full authority digital engine controller (FADEC).

Aspect 9—The temperature control system according to any of Aspects 1-8, wherein the control unit identifies a failure with one or more of the thermal sensors.

Aspect 10—The temperature control system according to any of Aspects 1-8, wherein the gas combustion engine further comprises a plurality of fuel injectors, such that fuel flows through at least one fuel injector into each of the combustion zones.

Aspect 11—The temperature control system according to Aspect 10, wherein the control unit decreases the flow of fuel through one or more of the fuel injectors into at least one combustion zone when the control unit determines the temperature in that at least one combustion zone is higher than the temperatures measured for the other combustion zones.

Aspect 12—The temperature control system according to Aspect 10, wherein the control unit increases the flow of fluid through one or more of the fuel injectors into at least one combustion zone when the control unit determines the temperature in that at least one combustion zone is lower than the temperatures measured for the other combustion zones.

Aspect 13—A method of managing the thermal output of a combustion engine comprises the following steps: providing a gas combustion engine that has a plurality of combustion zones; providing one or more temperature control systems integrated with the gas combustion engine; measuring the temperature in each of the combustion zones with smart thermal sensors; transmitting a thermal signal from each of the smart thermal sensors to a communication bus; and allowing the control unit to perform multiple functions. The multiple functions performed by the control unit include receiving the thermal signals from the communication bus, using the thermal signals to determine the need to adjust one or more operating parameters of the gas combustion engine, and adjusting one or more of the operating parameters. The temperature control system comprises a plurality of smart thermal sensors, a communication bus, and a control unit with at least one smart thermal sensor being located in each of the combustion zones.

Aspect 14—The method according to Aspect 13, wherein the smart thermal sensor comprises a thermocouple element, an analog to digital converter, and optionally, a protective sheath; wherein the smart thermal sensor converts the measured temperature from an analog thermal signal to a digital thermal signal prior to transmission of the thermal signal to the communication bus.

Aspect 15—The method according to any of Aspects 13 or 14, wherein the gas combustion engine is a gas turbine engine or a gas piston engine with the plurality of combustion zones ranging from 2 to 18.

Aspect 16—The method according to any of Aspects 13-15, wherein the control unit is an electronic control unit (ECU), an electronic engine control (EEC) unit, or a full authority digital engine controller (FADEC).

Aspect 17—The method according to any of Aspects 13-16, wherein the control unit identifies a failure with one or more of the thermal sensors.

Aspect 18—The method according to any of Aspects 13-16, wherein the gas combustion engine further comprises a plurality of fuel injectors, such that fuel flows through at least one fuel injector into each of the combustion zones. The control unit decreases the flow of fuel through one or more of the fuel injectors into at least one combustion zone when the control unit determines the temperature in that at least one combustion zone is higher than the temperatures measured for the other combustion zones. The control unit increases the flow of fluid through one or more of the fuel injectors into at least one combustion zone when the control unit determines the temperature in that at least one combustion zone is lower than the temperatures measured for the other combustion zones.

Aspect 19—The use of a temperature control system comprising a plurality of smart thermal sensors integrated with a gas combustion engine having a plurality of combustion zones according to any of Aspects 1-12; wherein measured thermal signals are used to adjust one or more operating parameters of the gas combustion engine.

Aspect 20—The use of a temperature control system comprising a plurality of smart thermal sensors integrated with a gas combustion engine having a plurality of combustion zones according to the method of any of Aspects 13-18.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application in order to enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A temperature control system integrated with a gas combustion engine that includes a plurality of combustion zones; the temperature control system comprising:
    a plurality of smart thermal sensors, wherein the smart thermal sensors are located such that at least one smart thermal sensor measures a temperature in real-time for each of the combustion zones and converts the measured temperature into a thermal signal;
    a communication bus through which the thermal signal from each of the smart thermal sensors is transmitted; and
    a control unit that receives the thermal signals from the communication bus;
    wherein the control unit uses the thermal signals to adjust one or more operating parameters of the gas combustion engine.

2. The temperature control system according to claim 1, wherein the control unit is an electronic control unit (ECU), an electronic engine control (EEC) unit, or a full authority digital engine controller (FADEC).

3. The temperature control system according to claim 1, wherein the control unit identifies a failure with one or more of the thermal sensors to measure the temperature in the combustion zone.

4. The temperature control system according to claim 1, wherein the gas combustion engine is a gas turbine engine or a gas piston engine.

5. The temperature control system according to claim 4, wherein the gas combustion engine is a gas turbine engine.

6. The temperature control system according to claim 1, wherein number of combustion zones ranges from 2 to 18.

7. The temperature control system according to claim 6, wherein the number of combustion zones ranges from 4 to 16.

8. The temperature control system according to claim 1, wherein the at least one smart thermal sensor outputs the thermal signal as a digital signal to the communication bus.

9. The temperature control system according to claim 8, wherein the at least one smart thermal sensor measuring the temperature in real-time comprises a thermocouple element and an analog to digital signal converter.

10. The temperature control system according to claim 9; wherein the smart thermal sensor further comprises a protective sheath.

11. The temperature control system according to claim 1, wherein the gas combustion engine further comprises a plurality of fuel injectors, such that fuel flows through at least one fuel injector into each of the combustion zones.

12. The temperature control system according to claim 11, wherein the control unit decreases the flow of fuel through one or more of the fuel injectors into at least one combustion zone when the control unit determines that the temperature in at least one combustion zone is higher than the temperatures measured for the other combustion zones.

13. The temperature control system according to claim 11, wherein the control unit increases the flow of fluid through one or more of the fuel injectors into at least one combustion zone when the control unit determines that the temperature in at least one combustion zone is lower than the temperatures measured for the other combustion zones.

14. A method of managing the thermal output of a combustion engine; wherein the method comprises:
    providing a gas combustion engine; the gas combustion engine having a plurality of combustion zones;
    providing one or more temperature control systems integrated with the gas combustion engine, the temperature control system comprising:
        a plurality of smart thermal sensors, wherein at least one smart thermal sensor is located in each of the combustion zones;
        a communication bus; and
        a control unit;
    measuring the temperature in each of the combustion zones with the smart thermal sensors;
    transmitting the measured temperature as a thermal signal from each of the smart thermal sensors to the communication bus; and allowing the control unit to perform the following functions:
receive the thermal signals from the communication bus;
use the thermal signals to determine the need to adjust one or more operating parameters of the gas combustion engine; and
adjust the one or more of the operating parameters.

15. The method according to claim 14, wherein the gas combustion engine is a gas turbine engine or a gas piston engine with the plurality of combustion zones ranging from 2 to 18.

16. The method according to claim 14, wherein the control unit is an electronic control unit (ECU), an electronic engine control (EEC) unit, or a full authority digital engine controller (FADEC).

17. The method according to claim 14, wherein the control unit identifies a failure with one or more of the thermal sensors to measure the temperature in the combustion zone.

18. The method according to claim 14, wherein the gas combustion engine further comprises a plurality of fuel injectors, such that fuel flows through at least one fuel injector into each of the combustion zones;
wherein the control unit decreases the flow of fuel through one or more of the fuel injectors into at least one combustion zone when the control unit determines that the temperature in the at least one combustion zone is higher than the temperatures measured for the other combustion zones;
wherein the control unit increases the flow of fluid through one or more of the fuel injectors into at least one combustion zone when the control unit determines that the temperature in the at least one combustion zone is lower than the temperatures measured for the other combustion zones.

19. The method according to claim 14, wherein each of the smart thermal sensors comprises a thermocouple element and an analog to digital converter;
wherein each of the smart thermal sensors converts the measured temperature from an analog thermal signal to a digital thermal signal prior to transmission of the thermal signal to the communication bus.

20. The method according to claim 19;
wherein each of the smart thermal sensors further comprises a protective sheath.

* * * * *